(No Model.)
C. E. DURYEA.
BICYCLE.
No. 333,936. Patented Jan. 5, 1886.
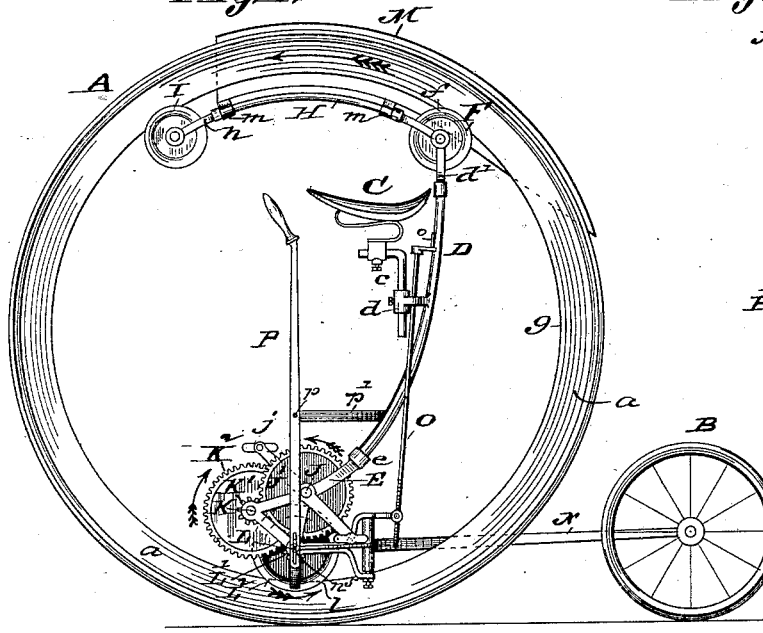
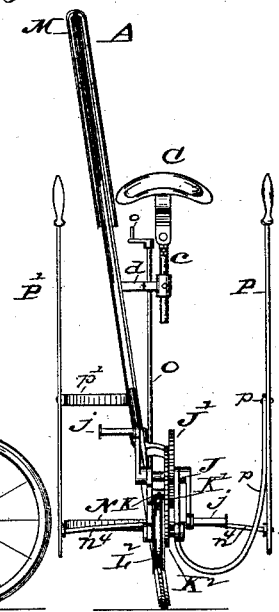
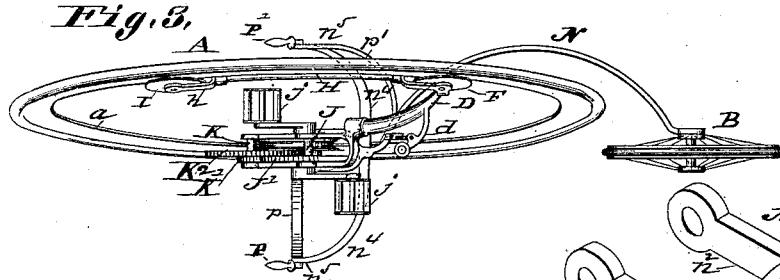
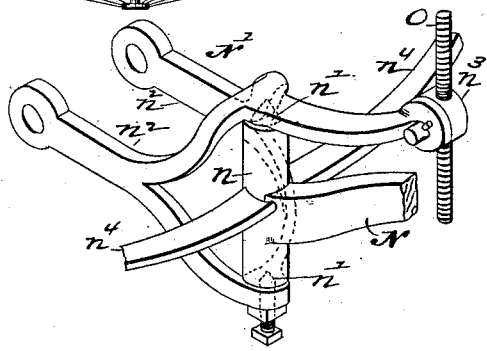
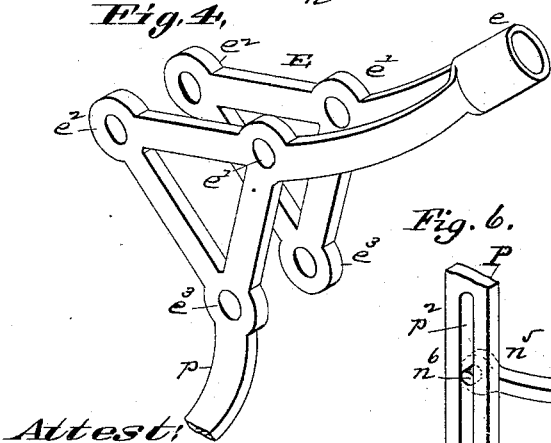
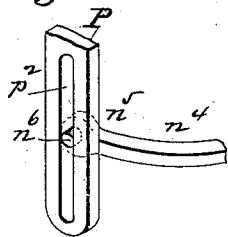
Inventor:
Charles E. Duryea
by C. D. Moody
atty
Attest:
Charles Pickle
Edward W. Purrell

UNITED STATES PATENT OFFICE.

CHARLES E. DURYEA, OF ST. LOUIS, MISSOURI.

BICYCLE.

SPECIFICATION forming part of Letters Patent No. 333,936, dated January 5, 1886.

Application filed August 24, 1885. Serial No. 175,232. (No model.)

*To all whom it may concern:*

Be it known that I, CHARLES E. DURYEA, of the city of St. Louis, in the State of Missouri, have made a new and useful Improvement in Bicycles, of which the following is a full, clear, and exact description.

The present velocipede has two wheels—a large one arranged in front of a small one, as in an ordinary bicycle. The backbone, however, leads from the small wheel horizontally, or nearly so, forward, and at its forward end is connected with a frame-work arranged within the rim of the large wheel, near the lower part thereof. The large wheel has no hub or spokes. The standard for supporting the rider's seat is held in the plane of the large wheel, the lower end of the standard being supported upon the frame-work with which the backbone is connected, and the upper end being provided with or attached to a grooved roller, which is adapted to roll upon the inner edge of the wheel-rim at the upper part of the wheel. The frame-work referred to also carries the pedal-shaft, a grooved roller adapted to roll upon the inner edge of the wheel-rim at the lower part of the wheel, and a train of gearing for transmitting the pedal-shaft motion to the lower grooved pulley, which is thereby caused to travel upon and by friction to drive the large wheel, and thereby to drive the bicycle. The large wheel in use inclines from an upright position and sufficiently to enable the rider to be seated alongside the wheel and directly over that part of the wheel which is toward the ground. In this position the rider can pass one arm over the top of the wheel and grasp a handle-bar upon the opposite side of the wheel which comes between that one of his arms and the side of his body.

The annexed drawings, making part of this specification, illustrate the best mode of carrying out the improvement.

Figure 1 is a side elevation, looking toward that side of the large wheel which the seat is upon. Fig. 2 is a front elevation, a portion of the wheel-rim (at the lower front of the wheel) being broken away. Fig. 3 is a plan. Fig. 4 is a view in perspective of the forward or main portion of the frame-work used to support the driving mechanism, rider's seat, &c. Fig. 5 is a view in perspective of the rear portion of the frame-work, and Fig. 6 is a view in perspective showing the lower end of one of the handle-bars and the part that connects therewith.

The same letters of reference denote the same parts.

A represents the large wheel, and B the small wheel.

C represents the rider's seat.

D represents the standard to which the seat is attached, the standard having an arm, $d$, Figs. 1, 2, which projects from the standard, and in which the seat, by some suitable means, such as the rod $c$, is vertically adjustably held. The standard at its lower end is held in a socket, $e$, in the frame-work E. At its upper end it carries the grooved pulley F. The pulley is journaled in a forked extension, $d'$, of the standard, and its grooved face $f$ is adapted to roll on the inner edge, $g$, of the wheel-rim $a$. The standard D, from the point of connection with the pulley F, is extended to form or is provided with an arm, H, which extends forward, and has, by means of the fork $h$, journaled in it a pulley, I, whose grooved face $i$ rolls on the inner edge of the wheel-rim at a point in front of the center of the wheel A. The frame-work E at the three points $e'$ $e^2$ $e^3$, respectively, has journaled in it the pedal-shaft J, the shaft K, and the shaft L. The pedal-shaft is also supplied with the gear J'. The shaft K has attached to it the pinion K' and the gear $K^2$. The shaft L has attached to it the pinion L' and the pulley $L^2$, whose grooved face $l$ rolls on the inner edge of the wheel-rim $a$ at the lower part of the wheel. The standard D, the frame-work E, and the various parts above described as being connected with the standard and frame-work, are thus held in place within the wheel-rim by means of the grooved pulleys F I $L^2$, and the wheel A is propelled by means of the pulley $L^2$, which acts by friction upon the wheel-rim. This last-named part is suitably shaped to co-act with the pulleys $L^2$, &c.; and in place of constructing the pulley $L^2$ and wheel-rim to act by friction, the wheel-rim may be in the form of or be furnished with a circular rack, and the pulleys $L^2$ F I be in the form of gears to engage therewith. In either case the rider operates the pedal-shaft in the ordinary manner. Its motion through the gear J' is transmitted to the pinion K' and shaft K. The gear K² transmits the motion of the shaft K, through the pinion L', to the shaft L and pulley L². The motion of the pedal-shaft is thus multiplied to any desirable degree before being applied to the wheel-rim; but, if preferred, the shafts J K and the gears J' K' K² L' may be omitted, and the pedals $j$ be attached to the shaft L, in which case the frame-work E is suitably modified to accord therewith, and the pulley L² in diameter may be enlarged.

A further modification of the construction is grooving the wheel-rim at its inner edge and adapting the pulleys L² F I to run in the groove. The wheel-rim is widened in the direction of the plane of the wheel, partly to keep the part upon which the pulleys roll well out of the dirt and partly to strengthen the wheel.

To prevent the dirt from being thrown by the large wheel onto the rider, a guard, M, may be used. Its preferable shape and arrangement are shown in Figs. 1, 2, the guard being exhibited in sectional elevation in Fig. 1. It extends over the wheel tire and rim at that part of the wheel which comes between the rider's arm and side, and it is held in place by means of the fastenings $m\ m$, which uphold the guard from the arm H.

N represents the backbone, perch, rod, or whatever it may be termed, which connects the two wheels A B. As it extends forward from the small wheel, the backbone bends laterally sufficiently to pass the rim of the large wheel, and also to provide sufficient room for the large wheel to swing in when it is turned to the left or right, as the case may be. After passing the large wheel the backbone curves inward, and at its forward end is connected with the frame-work above mentioned, and in such manner as not only to provide for turning the large wheel upon its point of connection with the backbone to the right and left, but also, preferably, so that the backbone carrying the small wheel can be turned upward and downward upon the frame-work of the large wheel, and thereby enable the small wheel to be raised when the bicycle is going upon a downward inclination, and to be lowered when the bicycle is upon an upward inclination. To these ends the backbone and its forward end has an upright extension, $n$, Figs. 1, 5, which at its ends $n'\ n'$ is pivoted in a frame, N', so that it can be swung horizontally in the frame. The frame N' in turn is connected with the frame-work E, so that it, carrying the backbone, can be turned upward and downward thereon, and this is accomplished conveniently by journaling the arms $n^2\ n^2$ of the frame N' upon the shaft L of the frame-work E.

To effect the last-described movement of the backbone, the frame N' is provided with or is constructed to form a nut, $n^3$, Fig. 5. A threaded rod, O, adapted to engage in the nut $n^3$, extends thence upward through and is held vertically in a suitable bearing, such as the arm $d$, and is provided with a handle, $o$, arranged within reach of the rider. By turning the rod O around in the nut $n^3$ the frame N' (and backbone and small wheel) is raised or lowered as the rod is turned upon the frame-work E.

To enable the large wheel to be turned to the right or left, the backbone is also supplied with a cross-arm, $n^4$, which, from the backbone, extends laterally to each side, curving forward, and at its ends $n^5\ n^5$ connecting, respectively, with the handle-levers P P'. These handle-levers are respectively pivoted to the bearings $p\ p'$, and at their lower ends are, by means of the slot $p^2$, Fig. 6, and the pin $n^6$ upon the arm $n^4$, jointed to that arm $n^4$, and so that as the rider moves the handle-levers forward and backward on their respective bearings $p\ p'$, and as in steering the ordinary bicycle, the large wheel is turned upon the extension $n$ of the backbone, and to the right or left, according to the direction in which the handle-levers are moved—that is, by drawing the right-hand handle-lever backward and moving the left-hand handle-lever forward, the large wheel is turned to the right, and with a contrary movement of the handle-bars is turned to the left. The bearing $p$ projects from the standard D. The bearing $p'$ is attached to the frame-work E, curving thence downward sufficiently to provide for the movement of the pedal on that side of the frame-work, and thence outward and upward, substantially as is represented in the drawings.

I claim—

1. A bicycle whose driving-wheel is inclined, and having the rider's seat alongside the wheel and over the bottom part, as described.

2. A bicycle whose driving-wheel is inclined, and having the rider's seat alongside it, as described.

3. A bicycle whose rider's seat is alongside the driving-wheel, as described.

4. The combination of the inclined wheel A, the standard D, supported at its ends in said wheel, and supporting the rider's seat at its side, as described.

5. The combination of the wheel A, the standard D, the pulleys F I L², the frame-work E, and the arm H, as described.

6. The combination of the inclined wheel A, the small wheel B, and the backbone N, said backbone leading from the small wheel forward and connecting with a frame-work within the rim of the large wheel.

7. The combination of the large wheel A, the small wheel B, and the backbone N, said backbone leading from the small wheel forward and connecting with a frame-work within the rim of the large wheel, which also supports the standard to which the rider's seat is attached.

8. The combination of the wheels A B and the backbone N, said backbone at its forward end being jointed, to swing laterally, to a frame-work held within the rim of the large wheel.

9. The combination of the wheels A B and the backbone N, said backbone at its forward end being jointed, to swing vertically, to a bearing held within the rim of the large wheel.

10. The combination of the wheels A B, the backbone N, the frame N', the frame-work E, the pulleys F I L², the standard D, and the arm H, as described.

11. The combination of the wheels A B, the handle-bars P P', the standard D, the frame-work E, the bearings $p$ $p'$, the backbone N, and the cross-arm $n^4$, as described.

12. The combination of the wheels A B, the frames E N', the backbone N, the standard D, and the screw O, as described.

Witness my hand.

CHARLES E. DURYEA.

Witnesses:
C. D. MOODY,
J. W. HOKE.